(12) United States Patent
Yoshikawa et al.

(10) Patent No.: US 7,709,549 B2
(45) Date of Patent: May 4, 2010

(54) PHOTOCURABLE RESIN COMPOSITION AND ARTICLE HAVING A COATING FORMED BY CURING SUCH COMPOSITION

(75) Inventors: Yuji Yoshikawa, Annaka (JP); Masaaki Yamaya, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 299 days.

(21) Appl. No.: 11/826,174

(22) Filed: Jul. 12, 2007

(65) Prior Publication Data

US 2008/0014450 A1 Jan. 17, 2008

(30) Foreign Application Priority Data

Jul. 13, 2006 (JP) ............................. 2006-192438

(51) Int. Cl.
*C09D 183/06* (2006.01)
*C09D 183/07* (2006.01)

(52) U.S. Cl. .............................. 522/78; 522/99; 528/32; 428/412; 428/447

(58) Field of Classification Search .................... 522/84, 522/85, 99, 78; 528/32, 33; 428/412, 447
See application file for complete search history.

(56) References Cited

U.S. PATENT DOCUMENTS

| | | | |
|---|---|---|---|
| 4,778,624 A * | 10/1988 | Ohashi et al. .................. 516/67 |
| 6,207,728 B1 * | 3/2001 | Sekiguchi et al. ............. 522/83 |
| 6,265,061 B1 | 7/2001 | Kang et al. | |
| 6,329,490 B1 | 12/2001 | Yamashita et al. | |
| 6,773,121 B2 * | 8/2004 | Miyatake et al. ............ 359/601 |
| 6,924,039 B2 * | 8/2005 | Ochiai ......................... 428/450 |
| 7,375,150 B2 * | 5/2008 | Fujihana ..................... 524/167 |
| 2003/0153682 A1 | 8/2003 | Sakugawa | |
| 2007/0141329 A1 * | 6/2007 | Yang et al. .................. 428/343 |

FOREIGN PATENT DOCUMENTS

| | | |
|---|---|---|
| JP | 5-320626 A | 12/1993 |
| JP | 9-278831 A | 10/1997 |
| JP | 2001-288325 A | 10/2001 |
| JP | 2002-363414 A | 12/2002 |
| JP | 2004-143449 A | 5/2004 |
| JP | 3572989 B2 | 7/2004 |
| JP | 3603133 B2 | 10/2004 |
| JP | 3673590 B2 | 4/2005 |
| JP | 2005-146110 A | 6/2005 |
| JP | 2006-70120 A | 3/2006 |

* cited by examiner

*Primary Examiner*—Susan W Berman
(74) *Attorney, Agent, or Firm*—Birch, Stewart, Kolasch & Birch, LLP.

(57) ABSTRACT

A thermosetting resin composition which forms a cured coating is provided. This resin composition is capable of providing the supporting substrate with scratch resistance, crack resistance, smudge proof property, removability of oil-base felted markers by wiping, and antistatic property. Also provided is an article having a coating formed from such composition. More specifically, the photocurable resin composition comprises (1) a siloxane compound containing a photoreactive group produced by hydrolyzing and condensing a system comprising (a) photoreactive group-containing hydrolyzable silane represented by formula (i) or (ii), with the proviso that, when one hydrolyzable silane is used, the silane comprises a trifunctional silane, and when two or more silanes are used, at least 70% by mole comprise a trifunctional silane, (b) a dimethylsiloxane containing a hydrolyzable group at opposite ends represented by formula (iii), and (c) a fluorine-containing hydrolyzable silane represented by formula (iv) in the presence of a basic catalyst by using water at an amount in excess of the amount required for hydrolyzing and condensing all hydrolyzable groups; (3) $(CF_3(CF_2)_m SO_2)_2NLi$ (wherein m is 0 to 7); and (4) a radical photopolymerization initiator. The article has a coating formed from this composition.

11 Claims, No Drawings

PHOTOCURABLE RESIN COMPOSITION AND ARTICLE HAVING A COATING FORMED BY CURING SUCH COMPOSITION

CROSS-REFERENCE TO RELATED APPLICATION

This non-provisional application claims priority under 35 U.S.C. §119(a) on Patent Application No. 2006-192438 filed in Japan on Jul. 13, 2006, the entire contents of which are hereby incorporated by reference.

TECHNICAL FIELD

This invention relates to a photocurable resin composition used as a coating composition or in the application of coating. This invention also relates to an article having a coating formed by curing such composition. More specifically, this invention relates to a photocurable resin composition which is capable of providing a cured coating simultaneously having contradictory properties of high hardness and crack resistance, and which is capable of forming a cured coating having an improved smudge proof property.

BACKGROUND ART

Synthetic resins such as polymethyl methacrylate resin, polycarbonate resin, polystyrene resin, cyclic polyolefin resin, polyethylene terephthalate resin, and triacetyl cellulose resin have advantageous properties including light weight, high transparency, and high workability, and therefore, these synthetic resins are recently finding wide applications in the field of optical disks such as CD and DVD, display windows such as liquid crystal and EL panels, and various functional films.

When such products are used, various types of smudges and fingerprints deposit on the surface of such resin, and since such smudge and fingerprint deposition is not preferable, the surface of an optical information medium is often subjected to an adequate surface treatment to thereby improve the smudge proof property, reduce fingerprint deposition, and improve removal of the fingerprints. For example, attempts have been made to provide a variety of water and oil repellent treatments on the surface of an optical information medium.

In order to improve scratch resistance of such surface, a transparent scratch resistant hard coating was commonly formed on the surface of the medium on the side of the incidence of the write and/or read beam. Such hard coating has been formed by coating a siloxane compound having a basket structure produced by hydrolyzing and condensing a compound having two or more photoreactive groups such as (meth)acryloyl group in one molecule or an alkoxysilane having a photoreactive group such as (meth)acryloyl group in the presence of a basic catalyst (JP-A 2002-363414 and JP-A 2004-143449: Patent Documents 1 and 2), or by coating a composition containing a reaction product of an alkoxysilane having a photoreactive group and a colloidal silica on the surface of the medium, and then curing the coating by irradiation of an active energy beam such as UV. This type of hard coating which has been formed principally for the purpose of improving the scratch resistance, however, had been inferior in the crack resistance, and smudge proof property for smudges such as fingerprints and removability of oil-base felted markers by wiping could not have been expected from such coating.

In view of such situation, a siloxane compound having a basket structure produced by hydrolyzing and condensing an alkoxysilane having a polymerizable functional group and an alkoxysilane having a perfluoroalkyl group in the presence of a basic catalyst was proposed (JP-B 3603133 and JP-B 3572989: Patent Documents 3 and 4). A coating formed by curing a composition containing such compound exhibits a larger contact angle with oleic acid indicating an improvement in the smudge proof property. However, removability of the oil-base felted marker by wiping was still insufficient, and this coating exhibited a drastic loss of the abrasion resistance.

In order to improve antistatic property, addition of various antistatic agents have also been attempted. Despite proposals of adding of a reaction product of polyether-modified silicone and lithium perchlorate (JP-A 5-320626: Patent Document 5), adding of a reaction product of polyfunctional acryl and lithium perchlorate (JP-B 3673590: Patent Document 6), and adding of a mixture of polyfunctional acrylate and $(CF_3SO_2)_2$NLi (JP-A 9-278831 and JP-A 2001-288325: Patent Documents 7 and 8), the coating produced in these attempts had insufficient scratch resistance.

In view of such situation, addition of a mixture of a silane hydrolysate and $(CF_3SO_2)_2$NLi (JP-A 2005-146110 and JP-A 2006-70120: Patent Documents 9 and 10) was proposed in order to improve the scratch resistance. The coating produced in these attempts, however, had insufficient smudge proof properties including the resistance to oil-base felted markers.

DISCLOSURE OF THE INVENTION

In view of the situation as described above, an object of the present invention is to provide a thermosetting resin composition which forms a cured coating capable of providing the supporting substrate with scratch resistance, crack resistance, smudge proof property for smudges such as fingerprints, removability of oil-base felted markers by wiping, and antistatic property. Another object of the present invention is to provide an article having a coating formed from such composition.

In order to achieve the objects as described above, the inventors of the present invention made an intensive study and found that a coating obtained by curing a photocurable resin composition comprising (1) a siloxane compound containing a photoreactive group produced by hydrolyzing and condensing a system comprising (a) at least one photoreactive group-containing hydrolyzable silane selected from the photoreactive group-containing hydrolyzable silanes represented by the following general formulae (i) and (ii), with the proviso that when one hydrolyzable silane is used for the photoreactive group-containing hydrolyzable silane, entire amount of the hydrolyzable silane comprises a trifunctional silane having 3 hydrolyzable groups, and when two or more hydrolyzable silanes are used for the photoreactive group-containing hydrolyzable silane, at least 70% by mole of the hydrolyzable silanes comprise a trifunctional silane having 3 hydrolyzable groups, (b) a dimethylsiloxane containing a hydrolyzable group at opposite ends represented the following general formula (iii), (c) a fluorine-containing hydrolyzable silane represented by the following general formula (iv), and optionally (d) another hydrolyzable silane, in the presence of a basic catalyst by using water at an amount in excess of the amount required for hydrolyzing and condensing all hydrolyzable groups;

(3) $(CF_3(CF_2)_mSO_2)_2$NLi (wherein m is 0 to 7);

(4) a radical photopolymerization initiator, and optionally;

(2) a (meth)acryl group-containing compound other than that of the component (1), is capable of providing the supporting substrate with scratch resistance, crack resistance, smudge proof property for smudges such as fingerprints, removability of oil-base felted markers by wiping, and antistatic properties with an article. The present invention has been completed on the bases of such findings.

Accordingly, the present invention provides a photocurable resin composition and an article having formed thereon a cured coating of such composition.

[1] A photocurable resin composition comprising (1) a siloxane compound containing a photoreactive group produced by hydrolyzing and condensing a system comprising the following (a), (b) and (c) in the presence of a basic catalyst by using water at an amount in excess of the amount required for hydrolyzing and condensing all hydrolyzable groups (a) at least one photoreactive group-containing hydrolyzable silane or a hydrolysate or a partial condensation product thereof, the photoreactive group-containing hydrolyzable silane being selected from those represented by the following general formulae (i) and (ii):

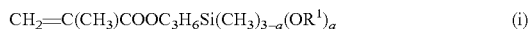
$$CH_2=C(CH_3)COOC_3H_6Si(CH_3)_{3-a}(OR^1)_a \quad (i)$$

$$CH_2=CHCOOC_3H_6Si(CH_3)_{3-b}(OR^2)_b \quad (ii)$$

wherein $R^1$ and $R^2$ are independently an alkyl group containing 1 to 4 carbon atoms or acetyl group, and a and b are independently an integer of 1 to 3;

with the proviso that when one hydrolyzable silane is used for the photoreactive group-containing hydrolyzable silane, entire amount of the hydrolyzable silane comprises a trifunctional silane having 3 hydrolyzable groups, and when two or more hydrolyzable silanes are used for the photoreactive group-containing hydrolyzable silane, at least 70% by mole of the hydrolyzable silanes comprise a trifunctional silane having 3 hydrolyzable groups;

(b) a dimethylsiloxane containing a hydrolyzable group at opposite ends represented by the following general formula (iii):

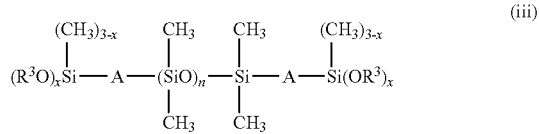

wherein $R^3$ is H, $CH_3$, $C_2H_5$, or $CH_3CO$, A is O or $C_2H_4$, n is an integer of 5 to 100, and x is an integer of 1 to 3; and (c) a fluorine-containing hydrolyzable silane represented by the following general formula (iv)

$$R^4R^5_{3-c}Si(OR^6)_c \quad (iv)$$

wherein $R^4$ is an organic group containing a perfluoroalkyl group containing 1 to 20 carbon atoms or an organic group containing a hexafluoropropene oxide, $R^5$ is an alkyl group containing 1 to 10 carbon atoms, cyclohexyl group, or phenyl group, $R^6$ is an alkyl group containing 1 to 4 carbon atoms or acetyl group, and c is an integer of 1 to 3;

content of the component (1) being 20 to 100 parts by weight in relation to 100 parts by weight of total of the component (1) and component (2);

(2) a compound containing (meth)acryl group other than the component (1):

content of the component (2) being 0 to 80 parts by weight in relation to 100 parts by weight of total of the component (1) and the component (2);

(3) $(CF_3(CF_2)_mSO_2)_2NLi$ (wherein m is 0 to 7), content of the component (3) being 0.5 to 15 parts by weight in relation to 100 parts by weight of total of the component (1) and the component (2); and (4) a radical photopolymerization initiator, content of the component (4) being 0.1 to 20 parts by weight in relation to 100 parts by weight of total of the component (1) and the component (2).

[2] The photocurable resin composition according to the above [1] wherein the photoreactive group-containing siloxane compound of the component (1) comprises the system containing the components (a) to (c) further comprising (d) another hydrolyzable silane represented by the following general formula (v):

$$R^7_dSi(OR^8)_{4-d} \quad (v)$$

wherein $R^7$ is an alkyl group containing 1 to 10 carbon atoms, cyclohexyl group, or phenyl group, $R^8$ is an alkyl group containing 1 to 4 carbon atoms or acetyl group, and d is an integer of 0 to 3; and the component (1) is the one produced by hydrolyzing and condensing the system comprising the components (a), (b), (c) and (d) in the presence of a basic catalyst by using water at an amount in excess of the amount required for hydrolyzing and condensing all hydrolyzable groups.

[3] The photocurable resin composition according to the above [1] or [2] wherein the component (a) is $CH_2=CHCOOC_3H_6Si(OCH_3)_3$.

[4] The photocurable resin composition according to the above [1] to [3] wherein the component (b) is dimethylsiloxane having both ends endcapped with trimethoxy group represented by the following general formula:

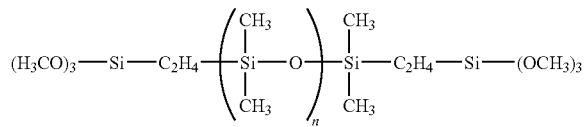

wherein n is an integer of 5 to 100.

[5] The photocurable resin composition according to any one of the above [1] to [4] wherein the component (c) is the one represented by the following general formula:

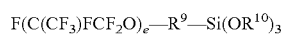
$$F(C(CF_3)FCF_2O)_e—R^9—Si(OR^{10})_3$$

wherein $R^9$ is $C(CF_3)FCH_2OC_3H_6$ or $C(CF_3)FC(=O)NHC_3H_6$, $R^{10}$ is an alkyl group containing 1 to 4 carbon atoms or acetyl group, and e is an integer of 2 to 50.

[6] The photocurable resin composition according to any one of the above [1] to [5] wherein the basic catalyst used in producing the component (1) is tetraalkylammonium hydroxide.

[7] The photocurable resin composition according to any one of the above [1] to [6] wherein the component (1) has a weight average molecular weight of up to 5,000.

[8] The photocurable resin composition according to any one of the above [1] to [7] wherein the silanol group content of the component (1) is up to 2% by weight.

[9] The photocurable resin composition according to any one of the above [1] to [8] wherein the component (3) is $(CF_3SO_2)_2NLi$.

[10] An article having formed thereon a cured coating of the photocurable resin composition of to any one of the above [1] to [9].

EFFECTS OF THE INVENTION

The photocurable resin composition of the present invention has realized an improved smudge proof property by incorporating a compound capable of introducing a fluorine-containing group and dimethylsiloxane chain in the structure. Since each component is firmly secured in the structure, a sufficient abrasion resistance is realized. In addition, an antistatic property is realized by incorporating the $(CF_3(CF_2)_m SO_2)_2NLi$ without detracting from other properties.

DESCRIPTION OF THE PREFERRED EMBODIMENTS

The photocurable resin composition of the present invention is a composition comprising
(1) a photoreactive group-containing siloxane compound as described below,
(3) a $(CF_3(CF_2)_mSO_2)_2NLi$ wherein m is 0 to 7), and
(4) a radical photopolymerization initiator, and optionally,
(2) a (meth)acryl group-compound other than the component (1).

(1) Photoreactive Group-containing Siloxane Compound

The photoreactive group-containing siloxane compound (1) of the present invention is produced by hydrolyzing and condensing a system comprising the following (a), (b) and (c), and optionally (d), in the presence of a basic catalyst by using water at an amount in excess of the amount required for hydrolyzing and condensing all hydrolyzable groups.

(a) At least one photoreactive group-containing hydrolyzable silane or a hydrolysate or a partial condensation product thereof, the photoreactive group-containing hydrolyzable silane being selected from those represented by the general formulae (i) and (ii) with the proviso that when one hydrolyzable silane is used for the photoreactive group-containing hydrolyzable silane, entire amount of the hydrolyzable silane comprises a trifunctional silane having 3 hydrolyzable groups, and when two or more hydrolyzable silanes are used for the photoreactive group-containing hydrolyzable silane, at least 70% by mole of the hydrolyzable silanes comprise a trifunctional silane having 3 hydrolyzable groups.

(b) A dimethylsiloxane containing a hydrolyzable group at opposite ends represented by the general formula (iii).

(c) A fluorine-containing hydrolyzable silane represented by the general formula (iv).

(d) An optionally used another hydrolyzable silane.

(a) Photoreactive Group-containing Hydrolyzable Silane

The photoreactive group-containing hydrolyzable silane used in the present invention is at least one hydrolyzable silane selected from those represented by the following general formulae (i) and (ii), or a hydrolysate or a partial condensation product thereof.

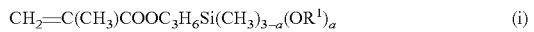  (i)

  (ii)

wherein $R^1$ and $R^2$ are independently an alkyl group containing 1 to 4 carbon atoms or acetyl group, a and b are independently an integer of 1 to 3.

In the formula, $R^1$ and $R^2$ are independently an alkyl group containing 1 to 4 carbon atoms such as methyl group, ethyl group, n-propyl group, i-propyl group, n-butyl group, i-butyl group, and t-butyl group, or acetyl group, and preferably, methyl group or ethyl group.

In the present invention, when only one hydrolyzable silane is used for the photoreactive group-containing hydrolyzable silane as described above, use of a trifunctional silane (a triorganoxysilane) containing 3 hydrolyzable groups ($OR^1$ or $OR^2$) is necessary, and when two or more hydrolyzable silanes are used for the photoreactive group-containing hydrolyzable silane, at least 70% by mole, and preferably at least 75% by mole of the hydrolyzable silanes should comprise a trifunctional silane containing 3 hydrolyzable groups ($OR^1$ or $OR^2$). The reason why a trifunctional silane should be used when only one hydrolyzable silane is used is that, when the entire hydrolyzable silane comprises a monofunctional silane (a monorganoxy silane) or a difunctional silane (a diorganoxy silane), curability is insufficient and a coating having an excellent abrasion resistance is not obtained. When the entire hydrolyzable silane comprises a tetrafunctional silane (a tetraorganoxy silane), the composition will take the form of gel in the synthesis of the composition. When two or more hydrolyzable silanes are used at the same time, at least 70% by mole of the hydrolyzable silanes should comprise trifunctional silane because a coating having an excellent abrasion resistance will not be formed when the monofunctional silane or the difunctional silane is used in excess of such amount, and use of a tetrafunctional silane results in the high tendency of crack generation. Even if such silanes are used in combination, realization of balanced properties is difficult.

Examples of the photoreactive group-containing hydrolyzable silane of the component (a) include

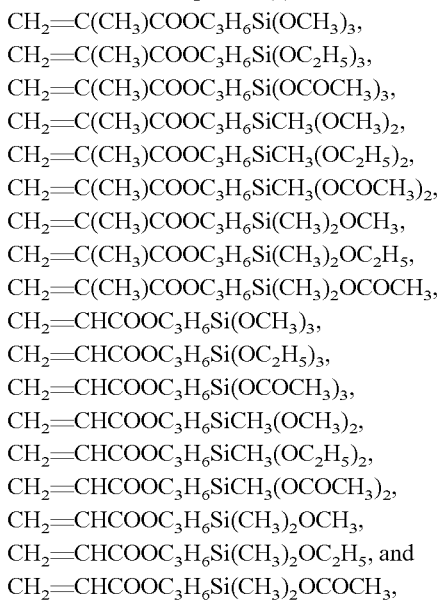

and among these, the preferred are

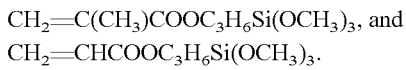

(b) Dimethylsiloxane Containing a Hydrolyzable Group at Opposite Ends

The dimethylsiloxane containing a hydrolyzable group at opposite ends is the one represented by the following general formula (iii):

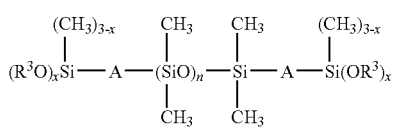

(iii)

wherein $R^3$ is H, $CH_3$, $C_2H_5$, or $CH_3CO$, A is O or $C_2H_4$, n is an integer of 5 to 100, and x is an integer of 1 to 3.

In the formula, n is an integer of 5 to 100, preferably 5 to 50, and more preferably 5 to 20. When n is smaller than 5, the crack resistance and the smudge proof property of the intended level are not realized, and the abrasion resistance will be insufficient when n is in excess of 100.

Preferable examples of the component (b) are those represented by the following formula:

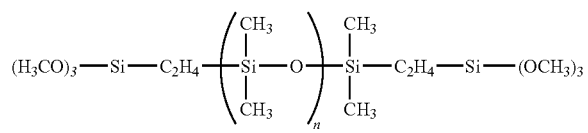

wherein n is as defined above.

The component (b) is preferably used at 0.01 to 10 parts by weight, and more preferably at 0.05 to 5 parts by weight in relation to 100 parts by weight of the component (a). Use at an amount less than 0.01 parts by weight may invite loss of the smudge proof property, whereas use in excess of 10 parts by weight may result in the reduced abrasion resistance.

(c) Fluorine-containing Hydrolyzable Silane

The fluorine-containing hydrolyzable silane used in the present invention is the one represented by the following general formula (iv):

$$R^4R^5{}_{3-c}Si(OR^6)_c \quad \text{(iv)}$$

wherein $R^4$ is an organic group containing a perfluoroalkyl group containing 1 to 20 carbon atoms or an organic group containing a hexafluoropropene oxide, $R^5$ is an alkyl group containing 1 to 10 carbon atoms, cyclohexyl group, or phenyl group, $R^6$ is an alkyl group containing 1 to 4 carbon atoms or acetyl group, and c is an integer of 1 to 3.

More specifically $R^4$ is an organic group represented by the general formula:

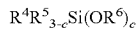$C_pF_{2p+1}$—, or $F[C(CF_3)F$—$CF_2O]_q$— wherein p is an integer of 1 to 19, and q is an integer of 1 to 250, and examples include $CF_3C_2H_4$—, $C_4F_9C_2H_4$—, $C_8F_{17}C_2H_4$—, $C_8F_{17}C_3H_6$—,
$C_3F_7OC(CF_3)FCF_2OC(CF_3)FCH_2OC_3H_6$—,
$C_3F_7OC(CF_3)FCF_2OC(CF_3)FC(=O)NHC_3H_6$—,
$F(C(CF_3)FCF_2O)_6C(CF_3)FC(=O)NHC_3H_6$—, and
$C_3F_7O(C_3F_6O)_rC_2F_4CH_2CH_2$ (wherein r is 2 to 100).

Exemplary fluorine-containing hydrolyzable silanes include
$CF_3C_2H_4Si(OCH_3)_3$, $CF_3C_2H_4Si(OC_2H_5)_3$, $CF_3C_2H_4Si(OCOCH_3)_3$,
$C_4F_9C_2H_4Si(OCH_3)_3$, $C_4F_9C_2H_4Si(OC_2H_5)_3$, $C_8F_{17}C_3H_6Si(OCH_3)_3$,
$C_8F_{17}C_3H_6Si(OC_2H_5)_3$, $C_3F_7OC(CF_3)FCF_2OC(CF_3)FCH_2OC_3H_6Si(OCH_3)_3$,
$C_3F_7OC(CF_3)FCF_2OC(CF_3)FCH_2OC_3H_6Si(OC_2H_5)_3$,
$C_3F_7OC(CF_3)FCF_2OC(CF_3)FC(=O)NHC_3H_6Si(OCH_3)_3$,
$C_3F_7OC(CF_3)FCF_2OC(CF_3)FC(=O)NHC_3H_6Si(OC_2H_5)_3$,
$F(C(CF_3)FCF_2O)_6C(CF_3)FC(=O)NHC_3H_6Si(OCH_3)_3$,
$F(C(CF_3)FCF_2O)_6C(CF_3)FC(=O)NHC_3H_6Si(OC_2H_5)_3$,
$C_3F_7O(C_3F_6O)_{23}C_2F_4CH_2CH_2Si(OCH_3)_3$, and
$C_3F_7O(C_3F_6O)_{23}C_2F_4CH_2CH_2Si(OC_2H_5)_3$.

Among these, the preferred is use of a compound having hexafluoropropene oxide chain in view of improving the effect of incorporating the $(CF_3(CF_2)_mSO_2)_2NLi$ or improving the antistatic additive.

The component (c) is preferably used at an amount of 0.01 to 30 parts by weight, and more preferably at 0.05 to 20 parts by weight in relation to 100 parts by weight of the component (a). When used at an amount less than 0.01 parts by weight, the intended smudge proof property may not be realized, and an amount in excess of 30 parts by weight may result in the poor abrasion resistance.

(d) Hydrolyzable Silane Other Than Components (a), (b), and (c)

In the present invention, a hydrolyzable silane other than components (a), (b), and (c) may be used in addition to the component (a), (b), and (c) as long as the properties of the invention are not adversely affected, examples of such silane include a hydrolyzable silane represented by the following general formula (v):

$$R^7{}_dSi(OR^8)_{4-d} \quad \text{(v)}$$

wherein $R^7$ is an alkyl group containing 1 to 10 carbon atoms, cyclohexyl group, or phenyl group, $R^8$ is an alkyl group containing 1 to 4 carbon atoms or acetyl group, and d is an integer of 0 to 3.

Examples of the alkyl group containing 1 to 10 carbon atoms of $R^7$ in the above formula include methyl group, ethyl group, propyl group, butyl group, pentyl group, and hexyl group.

Examples of the $R^8$ are the same as those indicated for $R^1$ and $R^2$.

Examples of such hydrolyzable silane include, in view of improving the abrasion resistance,
$Si(OCH_3)_4$, $Si(OC_2H_5)_4$, $CH_3Si(OCH_3)_3$, and $CH_3Si(OC_2H_5)_3$;

in view of improving the crack resistance,
$(CH_3)_2Si(OCH_3)_2$, $(CH_3)_2Si(OC_2H_5)_2$, $C_6H_5Si(OCH_3)_3$, $C_6H_5Si(OC_2H_5)_3$, $C_6H_{12}Si(OCH_3)_3$, $C_6H_{12}Si(OC_2H_5)_3$, $(CH_3)_3SiOCH_3$, and $(CH_3)_3SiOC_2H_5$, and in view of improving the smudge proof property,
$C_3H_7Si(OCH_3)_3$, $C_3H_7Si(OC_2H_5)_3$, $C_6H_{13}Si(OCH_3)_3$, $C_6H_{13}Si(OC_2H_5)_3$,
$C_{10}H_{21}Si(OCH_3)_3$, and $C_{10}H_{21}Si(OC_2H_5)_3$.

Use of a partial hydrolysate of such compound is also allowable.

The component (d) is preferably used at an amount of 0 to 30 parts by weight, and more preferably at 0 to 20 parts by weight in relation to 100 parts by weight of the component (a). An amount in excess of 30 parts by weight may results in the loss of smudge proof property. When the component (d) is incorporated, incorporation at an amount of at least 2 parts by weight is preferable.

The photoreactive group-containing siloxane compound may be produced by hydrolyzing and condensing the starting organosilicon compounds, namely, the silane compound containing a hydrolyzable group as described above, or a hydrolysate or a partial condensation product thereof [components (a), (b), and (c) and optionally, component (d)] in the presence of a basic catalyst by using water at an amount in excess of the amount required for hydrolyzing and condensing all hydrolyzable groups.

The hydrolysis may be carried out by any method including simultaneous hydrolysis in which the starting organosilicon compounds are all blended or added dropwise at once for simultaneous hydrolysis and multi-step hydrolysis in which the fluorine-containing hydrolyzable silane is preliminary hydrolyzed by taking reactivity of the hydrolyzable silane into consideration.

Exemplary basic catalyst used in the hydrolysis include sodium hydroxide, potassium hydroxide, ammonia, tetraalkyl ammonium hydroxide, amine compound, sodium salt of an organic acid, potassium salt of an organic acid, and basic ion-exchange resin, and the preferred is tetraalkyl ammonium hydroxide.

Amount of the basic catalyst added is preferably 0.1 to 20% by weight, and in particular, 1 to 10% by weight in relation to the starting organosilicon compound.

Amount of the water used for the hydrolysis and condensation is an amount in excess of the amount required for hydrolyzing and condensing all of the hydrolyzable groups ($OR^1$, $OR^2$, $OR^3$, $OR^6$, and $OR^8$) in the starting organosilicon compounds incorporated, and more specifically, an amount in excess of 0.55 to 10 mole, and preferably 0.6 to 5 mole per 1 mole of the hydrolyzable groups in the starting formulation. When water is used an amount less than 0.55 mole, hydrolysis of the hydrolyzable groups will in insufficient, and an amount in excess of 10 mole will result in an insufficient condensation. In either case, the dimethylsiloxane will remain partly unreacted resulting in water repellency on the surface of the coating.

The hydrolysis and condensation reactions are preferably carried out in an alcohol such as methanol, ethanol, propanol, isopropanol, n-butanol, isobutanol, or t-butanol. In this case, the alcohol is used at an amount of 50 to 2,000 parts by weight in relation to 100 parts by weight of the total of the components (a), (b), (c), and (d).

The hydrolysis and condensation reactions are preferably conducted by mixing the starting organosilicon compounds [the components (a), (b), and (c), and optionally, the component (d)], the alcohol, and the basic catalyst, and adding water to this mixture. The reaction temperature in this process is typically 0° C. to 200° C., and more preferably 0° C. to 50° C.

After the hydrolysis and condensation, the reaction product is neutralized with an acid or by washing with water, and a photoreactive group-containing siloxane compound which is highly stable even in the substantial absence of the solvent is obtained by removing the alcohol and the like through distillation.

The thus obtained photoreactive group-containing siloxane compound preferably has a weight average molecular weight of up to 5,000, and more preferably 1,500 to 4,000. When the weight average molecular weight is less than 1,500, condensation will be insufficient and storage stability will also be insufficient with the dimethylsiloxane remaining partly unreacted and the coating surface may exhibit water repellency. When the weight average molecular weight is in excess of 5,000, the composition will have an unduly high viscosity resulting in the handling inconvenience. The weight average molecular weight is the value measured by gel permeation chromatography (GPC) in terms of polystyrene.

The thus obtained photoreactive group-containing siloxane compound may contain the silanol group at an amount of up to 2% by weight, and more preferably up to 1% by weight. The amount in excess of 2% by weight is associated with the risk of problems such as poor storage stability. Although the amount of the silanol group may be 0%, reduction of the silanol group to 0% is practically difficult, and the composition generally contains 0.05% by weight.

(2) (Meth)acryl Group-Containing Compound Other than the Component (1)

The present invention also contains a (meth)acryl group-containing compound other than the component (1). This component constitutes the main portion of the curable components of the composition together with the photoreactive group-containing siloxane compound (1), and accordingly, matrix of the coating generated by the curing of the coating. The (meth)acryl group-containing compound is the compound containing at least two (meth)acryl groups in one molecule, and non-limiting examples include 1,6-hexanediol di(meth)acrylate, triethylene glycol di(meth)acrylate, ethylene oxide-modified bisphenol A di(meth)acrylate, trimethylolpropane tri(meth)acrylate, pentaerythritol tetra(meth)acrylate, di trimethylolpropane tetra(meth)acrylate, dipentaerythritol hexa(meth)acrylate, pentaerythritol tri (meth)acrylate, 3-(meth)acryloyloxy glycerin mono(meth)acrylate, urethane acrylate, epoxy acrylate, and polyester acrylate.

These compounds may be used either alone or in combination of two or more.

The component (1) may be incorporated at an amount of 20 to 100 parts by mass, and preferably at 30 to 90 parts by weight in relation to 100 parts by weight of the total of the components (1) and (2), and the component (2) may be incorporated at an amount of 0 to 80 parts by mass, and preferably at 10 to 70 parts by weight in relation to 100 parts by weight of the total of the components (1) and (2). When the component (2) is incorporated at an amount of less than 10 parts by weight, viscosity will be unduly high resulting in the poor working efficiency in the coating. The amount in excess of 80 parts by weight, on the other hand, results in the loss of properties such as scratch resistance and smudge proof property.

(3) $(CF_3(CF_2)_mSO_2)_2NLi$

In the present invention, $(CF_3(CF_2)_mSO_2)_2NLi$ (wherein m is 0 to 7) is used as an antistatic agent having good compatibility and solubility. When the $(CF_3(CF_2)_mSO_2)_2NLi$ is incorporated, both the as cured article and the cured article placed at a high temperature and high humidity condition exhibit a surface resistivity of $10^{15}\Omega$ or less, realizing the effect of preventing the dust deposition.

When m is greater than 7, the resulting composition will exhibit poor compatibility and solubility. The preferred is $(CF_3SO_2)_2NLi$ wherein m is 0.

The component (3) is incorporated at an amount of 0.5 to 15 parts by weight, and preferably at 1 to 10 parts by weight in relation to 100 parts by weight of the total of the components (1) and (2). When the component (3) is incorporated at less than 0.5 parts by weight, the antistatic effect will be insufficient, and when the amount exceeds 15 parts by weight, bleeding tends to occur under high temperature and high humidity conditions and the coating will exhibit poor smudge proof property.

(4) Radical Photopolymerization Initiator

The composition of the present invention contains radical photopolymerization initiator (4). The radical photopolymerization initiator may be selected from those commonly used in the art such as acetophenone, benzoin, acylphophineoxide, benzophenone, and thioxanthone photopolymerization initiators, and examples include benzophenone, benzyl, Michler's ketone, thioxanthone derivative, benzoin ethyl ether, diethoxyacetophenone, benzyldimethyl ketal, 2-hydroxy-2-methyl propiophenone, 1-hydroxycyclohexylphenyl ketone, acylphosphineoxide derivative, 2-methyl-1-{4-(methylthio)phenyl}-2-molpholinopropane-1-one, 4-benzoyl-4'-methyl diphenylsulphide, and 2,4,6-trimethylbenzoyldiphenyl phosphine, which may be used alone or in combination of two or more. Among these, the preferred are benzyldimethyl ketal, 1-hydroxycyclohexylphenyl ketone, hydroxydimethyl acetophenone, 2-methyl-1-{4-(methylthio)phenyl}-2-molpholinopropane-1-one, 4-benzoyl-4'-methyldiphenyl sulfide, and 2,4,6-trimethylbenzoyldiphenyl phosphine.

Radical photopolymerization initiator may be incorporated at 0.1 to 20 parts by weight, and more preferably at 0.5 to 10 parts by weight in relation to 100 parts by weight of the total of the components (1) and (2). An amount less than 0.1 parts by weight results in the poor workability, and an amount in excess of 20 parts by weight results in the poor surface hardness.

The photocurable resin composition of the present invention may optionally contain additives such as metal oxide fine particles, silane coupling agent, non-polymerizable dilution solvent, polymerization inhibitor, antioxidant, UV absorbent, light stabilizer, antifoaming agent, leveling agent, and surface tension reducer to the extent that does not adversely affects the merits of the present invention.

The metal oxide fine particles may be fine particles of oxide of Si, Ti, Al, Zn, Zr, In, Sn, Sb, and the like and complex oxides thereof, whose surface is optionally coated with silica, alumina, or the like. Exemplary metal oxide fine particles include fine particles of silica, alumina, zirconia, and titania, and the preferred are fine particles of silica. Addition of such metal oxide fine particles results in the improvement of various properties including the abrasion resistance.

The silica fine particles used may be hollow or porous silica fine particles which are expected to reduce the refractive index.

Among the silica fine particles as described above, the preferred are those surface modified with a hydrolyzable silane compound having a group which is reactive to an active energy beam since such reactive silica fine particles will be secured to the interior of the polymer matrix by undergoing a crosslinking reaction by exposure to an active energy beam.

The metal oxide fine particles may be incorporated at an amount of 0.1 to 50 parts by weight in relation to 100 parts by weight of the total of the components (1) and (2).

By coating and subsequently curing the coating, the photocurable resin composition of the present invention is capable of providing scratch resistance, crack resistance, smudge proof property for smudges such as fingerprints, and removability of oil-base felted markers by wiping with the article which needs a smudge proof coating on its surface, in particular, on the surface of an optical information medium such read-only optical disk, optical recording disk, or magnetooptical recording disk, and more specifically on the surface of such medium on the side of the incidence of the write or read beam, on surface of an optical lens, optical filter, or anti-reflection film, or on the surface of a display device such as liquid crystal display, CRT display, plasma display, or EL display. The article having such cured coating will be provided with improved smudge proof property and lubricity as well as excellent scratch resistance and abrasion resistance.

The coating of the photocurable resin composition may be formed, for example, by spin coating.

The coating formed preferably has a thickness of 0.1 to 50 μm, and in particular, 0.5 to 30 μm. When the coating is too thin, the coating may have an insufficient abrasion resistance, and an excessively thick coating may suffer from reduced crack resistance.

The source of light beam used for curing the photocurable resin composition is typically a source including the light at a wavelength in the range of 200 to 450 nm, for example, high pressure mercury vapor lamp, ultrahigh pressure mercury vapor lamp, metal halide lamp, xenon lamp, and carbon ark lamp. Although the dose is not particularly limited, exposure to 10 to 5,000 mJ/cm$^2$, and in particular, to 20 to 1,000 mJ/cm$^2$ is preferable. The curing time is typically 0.5 seconds to 2 minutes, and preferably 1 second to 1 minute.

EXAMPLES

Next, the present invention is described in detail by referring to the Synthetic Examples, Examples, and Comparative Examples, which by no means limit the scope of the present invention.

In the embodiments described below, volatile content was measured according to JIS C 2133, refractive index was measured according to JIS K 0062, OH content was measured according to JIS K 0070, and viscosity is the value measured at 25° C. using a Model B viscometer, and weight average molecular weight is the value measured by GPC (gel permeation chromatography) using THF (tetrahydrofuran) for the solvent with HLC-8220 manufactured by Tosoh Corporation.

Resistance to oil-base felted marker was evaluated by drawing a line on a cured coating with a commercially available oil-base felted marker, wiping the line with a cloth, and observing the degree of removal by the wiping.

Smudge proof property was measured by evaluating. contact angle with water and contact angle with oleic acid using a contact angle meter (CA-X150 manufactured by Kyowa Interface Science). (A larger contact angle indicates better smudge proof property.)

Scratch resistance and abrasion resistance were measured according to ASTM D 1044 by conducing abrasion test of the cured coating using Taber abrasion tester (using abrasion wheel CS-10F), measuring turbidity of the cured coating before and after the abrasion test using a turbidimeter (NDH2000 manufactured by Nippon Denshoku Industries Co., Ltd.), and calculating ΔHaze, namely, (turbidity after the abrasion test)−(turbidity before the abrasion test) (The scratch resistance and the abrasion resistance were evaluated "good" when the ΔHaze was 15 or less.)

Surface resistance was measured using a high resistivity meter (Hiresta-UP MCP-HT450 manufactured by DIA Instrument), and half life was measured using electrified charge attenuation measuring instrument (STATIC HONESTMETER manufactured by Shishido Electrostatic, LTD.), both in an atmosphere at 25° C. and a relative humidity of 50%.

Synthesis Example 1

227.0 parts by weight (0.97 mol) of $CH_2$=$CHCOOC_3H_6Si(OCH_3)_3$, 17.0 parts by weight (0.03 mol) of $C_8F_{17}C_2H_4Si(OCH_3)_3$, 1.1 parts by weight (0.0011 mol) of dimethylsiloxane with both ends endcapped with trimethoxy group represented by formula:

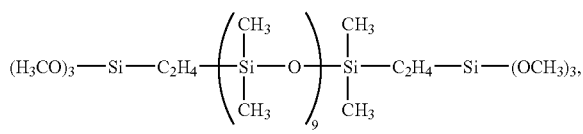

and 715.8 parts by weight of isopropyl alcohol were mixed in a reaction vessel, and when the mixture became homogeneous, 32.3 parts by weight of 10% by weight solution of tetramethyl ammonium hydroxide in methanol and 108.2 parts by weight of water which corresponds to twice molar amount of the alkoxy group (6.01 mol of water) were added, and the mixture was stirred at 25° C. for 12 hours. Toluene was added to the mixture, and the mixture was washed with water. After neutralization, methanol and toluene were removed by distillation.

The reaction product had a volatile content of 0.6%, a viscosity of 72,000 mPa·s, a refractive index of 1.4690, a OH content of 0.4% by weight, and a weight average molecular weight of 3,400.

Synthesis Example 2

227.0 parts by weight (0.97 mol) of $CH_2$=$CHCOOC_3H_6Si(OCH_3)_3$, 8.6 parts by weight (0.015 mol) of $C_8F_{17}C_2H_4Si(OCH_3)_3$, 20.0 parts by weight (0.015 mol) of $F(C(CF_3)FCF_2O)_6C(CF_3)FC(=O)NHC_3H_6Si(OCH_3)_3$, 1.1 parts by weight (0.0011 mol) of dimethylsiloxane having both ends endcapped with trimethoxy group represented by formula:

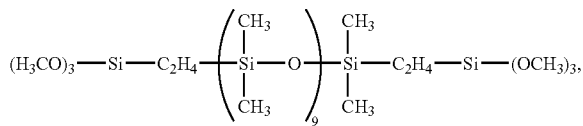

and 715.8 parts by weight of isopropyl alcohol were mixed in a reaction vessel, and when the mixture became homogeneous, 32.3 parts by weight of 10% by weight solution of tetramethyl ammonium hydroxide in methanol and 108.2 parts by weight of water which corresponds to twice molar amount of the alkoxy group (6.01 mol of water) were added, and the mixture was stirred at 25° C. for 12 hours. After adding toluene to the mixture and washing the mixture with water for neutralization, methanol and toluene were removed by distillation.

The reaction product had a volatile content of 0.4%, a viscosity of 59,000 mPa·s, a refractive index of 1.4648, a OH content of 0.6% by weight, and a weight average molecular weight of 3,000.

Example 1

100 parts by weight of the compound obtained in the Synthesis Example 1 was mixed with 7.5 parts by weight of $(CF_3SO_2)_2NLi$ and 5 parts by weight of DAROCUR 1173 (product name of a radical initiator manufactured by Ciba Specialty Chemicals), and the mixture was coated on a polycarbonate sheet to a thickness of 5 μm. The coating was exposed to 80 W high-pressure mercury-vapor lamp for 2 seconds (accumulated radiation dose, 200 mJ/cm$^2$) for curing.

The resulting coating had an acceptable resistance to oil-base felted marker, a contact angle with water of 102°, a contact angle with oleic acid of 61°, and a sufficient smudge proof property. In the Taber abrasion test (at a load of 500 g and a rotation of 100), the coating exhibited a ΔHaze of 13 indicating a high abrasion resistance of the coating. The coating also had a low surface resistivity of $1 \times 10^{13} \Omega$, and a short half life of 2 min.

Example 2

80 parts by weight of the compound obtained in Synthesis Example 1 was mixed with 20 parts by weight of 1,6-hexanediol diacrylate, 7.5 parts by weight of $(CF_3SO_2)_2NLi$, and 5 parts by weight of DAROCUR 1173 (product name of a radical initiator manufactured by Ciba Specialty Chemicals), and the mixture was coated and cured by repeating the procedure of Example 1.

The resulting coating had an acceptable resistance to oil-base felted marker, a contact angle with water of 105°, a contact angle with oleic acid of 66°, and a sufficient smudge proof property. In the Taber abrasion test (at a load of 500 g and a rotation of 100), the coating exhibited a ΔHaze of 10 indicating a high abrasion resistance of the coating. The coating also had a low surface resistivity of $2 \times 10^{13} \Omega$, and a short half life of 2 min.

Example 3

80 parts by weight of the compound obtained in Synthesis Example 2 was mixed with 20 parts by weight of 1,6-hexanediol diacrylate, 7.5 parts by weight of $(CF_3SO_2)_2NLi$, and 5 parts by weight of DAROCUR 1173 (product name of a radical initiator manufactured by Ciba Specialty Chemicals), and the mixture was coated and cured by repeating the procedure of Example 1.

The resulting coating had an acceptable resistance to oil-base felted marker, a contact angle with water of 108°, a contact angle with oleic acid of 70°, and a sufficient smudge proof property. In the Taber abrasion test (at a load of 500 g and a rotation of 100), the coating exhibited a ΔHaze of 11 indicating a high abrasion resistance of the coating. The coating also had a low surface resistivity of $5 \times 10^{12} \Omega$, and a short half life of 1 min.

Comparative Example 1

100 parts by weight of the compound obtained in Synthesis Example 1 was mixed with 5 parts by weight of DAROCUR 1173 (product name of a radical initiator manufactured by Ciba Specialty Chemicals), and the mixture was coated and cured by repeating the procedure of Example 1.

The resulting coating had an acceptable resistance to oil-base felted marker, a contact angle with water of 105°, a contact angle with oleic acid of 66°, and a sufficient smudge proof property. In the Taber abrasion test (at a load of 500 g and a rotation of 100), the coating exhibited a ΔHaze of 11 indicating a high abrasion resistance of the coating. The coating also had a high surface resistivity of $1 \times 10^{14} \Omega$ or higher, and a long half life of at least 60 min.

Comparative Synthesis Example 1

234.0 parts by weight (1.00 mol) of $CH_2$=$CHCOOC_3H_6Si(OCH_3)_3$, 5.5 parts by weight (0.0054 mol) of dimethylsiloxane having both ends endcapped with trimethoxy group represented by formula:

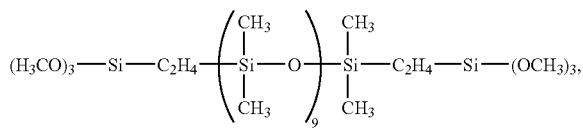

and 681.6 parts by weight of isopropyl alcohol were mixed in a reaction vessel, and when the mixture became homogeneous, 31.2 parts by weight of 10% by weight solution of tetramethyl ammonium hydroxide in methanol, and 108.8 parts by weight of water which corresponds to twice molar amount of the alkoxy group (6.04 mole of water) were added, and the mixture was stirred at 25° C. for 12 hours. After adding toluene to the mixture and washing the mixture with water for neutralization, methanol and toluene were removed by distillation.

The reaction product had a volatile content of 0.6%, a viscosity of 89,000 mPa·s, a refractive index of 1.4790, a OH content of 0.3% by weight, and a weight average molecular weight of 3,000.

Comparative Example 2

100 parts by weight of the compound obtained in the Synthesis Example 1 was mixed with 5 parts by weight of $(CF_3SO_2)_2NLi$ and 5 parts by mass of DAROCUR 1173 (product name of a radical initiator manufactured by Ciba Specialty Chemicals), and the mixture was coated and cured by repeating the procedure of Example 1.

In the Taber abrasion test (at a load of 500 g and a rotation of 100), the coating exhibited a ΔHaze of 11 indicating a high abrasion resistance of the coating. The coating also had a low surface resistivity of $8 \times 10^{13} \Omega$, and a short half life of at least 5 min. However, the resulting coating had an unacceptable resistance to oil-base felted marker, a low contact angle with water of 90°, and a low contact angle with oleic acid of 51°.

Comparative Synthesis Example 2

227.0 parts by weight (0.97 mol) of $CH_2=CHCOOC_3H_6Si(OCH_3)_3$, 17.0 parts by weight (0.03 mol) of $C_8F_{17}C_2H_4Si(OCH_3)_3$, and 711.3 parts by weight of isopropyl alcohol were mixed in a reaction vessel, and when the mixture became homogeneous, 32.1 parts by mass of 10% by weight solution of tetramethyl ammonium hydroxide in methanol, and 108.0 parts by weight of water which corresponds to twice molar amount of the alkoxy group (6.00 mol of water) were added, and the mixture was stirred at 25° C. for 12 hours. After adding toluene to the mixture and washing the mixture with water for neutralization, methanol and toluene were removed by distillation.

The reaction product had a volatile content of 0.7%, a viscosity of 10,700 mPa·s, a refractive index of 1.4700, a OH content of 0.5% by weight, and a weight average molecular weight of 2,800.

Comparative Example 3

100 parts by weight of the compound obtained in the Comparative Synthesis Example 2 was mixed with 5 parts by weight of $(CF_3SO_2)_2NLi$ and 5 parts by mass of DAROCUR 1173 (product name of a radical initiator manufactured by Ciba Specialty Chemicals), and the mixture was coated and cured by repeating the procedure of Example 1.

The coating had a low surface resistivity of $2 \times 10^{13} \Omega$, and a short half life of 2 min. However, in the Taber abrasion test (at a load of 500 g and a rotation of 100), the coating exhibited a ΔHaze of 17 indicating the low abrasion resistance of the coating. The resulting coating also had an unacceptable resistance to oil-base felted marker, a low contact angle with water of 96°, and a low contact angle with oleic acid of 58°.

Synthesis Example 3

227.0 parts by weight (0.97 mol) of $CH_2=CHCOOC_3H_6Si(OCH_3)_3$, 40.0 parts by weight (0.03 mol) of $F(C(CF_3)FCF_2O)_6C(CF_3)FC(=O)NHC_3H_6Si(OCH_3)_3$, 1.1 parts by weight (0.0011 mol) of dimethylsiloxane having both ends endcapped with trimethoxy group represented by formula:

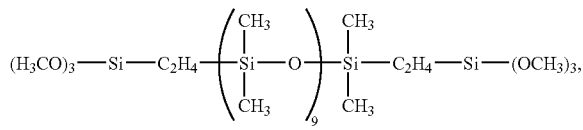

and 827.8 parts by weight of isopropyl alcohol were mixed in a reaction vessel, and when the mixture became homogeneous, 36.4 parts by mass of 10% by weight solution of tetramethyl ammonium hydroxide in methanol, 108.2 parts by weight of water which corresponds to twice molar amount of the alkoxy group (6.01 mol of water) were added, and the mixture was stirred at 25° C. for 12 hours. Toluene was added to the mixture, and the mixture was washed with water. After neutralization, methanol and toluene were removed by distillation.

The reaction product had a volatile content of 0.5%, a viscosity of 88,000 mPa·s, a refractive index of 1.4627, a OH content of 0.6% by weight, and a weight average molecular weight of 3,100.

Example 4

80 parts by weight of the compound obtained in Synthesis Example 3 was mixed with 20 parts by weight of 1,6-hexanediol diacrylate, 7.5 parts by weight of $(CF_3SO_2)_2NLi$, and 5 parts by weight of DAROCUR 1173 (product name of a radical initiator manufactured by Ciba Specialty Chemicals), and this mixture was coated and dried by repeating the procedure of Example 1.

The resulting coating had an acceptable resistance to oil-base felted marker, a contact angle with water of 111°, a contact angle with oleic acid of 73°, and a sufficient smudge proof property. In the Taber abrasion test (at a load of 500 g and a rotation of 100), the coating exhibited a ΔHaze of 13 indicating a high abrasion resistance of the coating. The coating also had a low surface resistivity of $1 \times 10^{12} \Omega$, and a short half life of 1 min.

Japanese Patent Application No. 2006-192438 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:
1. A photocurable resin composition, comprising:
(1) a siloxane compound containing a photoreactive group produced by hydrolyzing and condensing a system comprising the following (a), (b) and (c) in the presence of a basic catalyst by using water at an amount in excess of the amount required for hydrolyzing and condensing all hydrolyzable groups
(a) at least one photoreactive group-containing hydrolyzable silane or a hydrolysate or a partial condensation product thereof, the photoreactive group-containing hydrolyzable silane being selected from those represented by the following general formulae (i) and (ii):

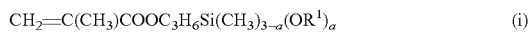

wherein $R^1$ and $R^2$ are independently an alkyl group containing 1 to 4 carbon atoms or acetyl group, and a and b are independently an integer of 1 to 3;
with the proviso that when one hydrolyzable silane is used for the photoreactive group-containing hydrolyzable silane, entire amount of the hydrolyzable silane comprises a trifunctional silane having 3 hydrolyzable groups, and when two or more hydrolyzable silanes are used for the photoreactive group-containing hydrolyzable silane, at least 70% by mole of the hydrolyzable silanes comprise a trifunctional silane having 3 hydrolyzable groups;
(b) a dimethyisiloxane containing a hydrolyzable group at opposite ends represented by the following general formula (iii):

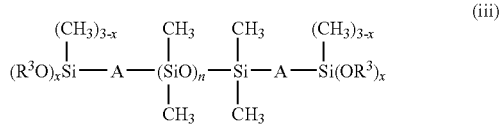

wherein $R^3$ is H, $CH_3$, $C_2H_5$, or $CH_3CO$, A is O or $C_2H_4$, n is an integer of 5 to 100, and x is an integer of 1 to 3; and
(c) a fluorine-containing hydrolyzable silane represented by the following general formula (iv)

wherein $R^4$ is an organic group containing a perfluoroalkyl group containing 1 to 20 carbon atoms or an organic group containing a hexafluoropropene oxide, $R^5$ is an alkyl group containing 1 to 10 carbon atoms, cyclohexyl group, or phenyl group, $R^6$ is an alkyl group containing 1 to 4 carbon atoms or acetyl group, and c is an integer of 1 to 3;
content of the component (1) being 20 to 100 parts by weight in relation to 100 parts by weight of total of the component (1) and component (2);
(2) a compound containing (meth)acryl group other than the component (1):
content of the component (2) being 0 to 80 parts by weight in relation to 100 parts by weight of total of the component (1) and the component (2);
(3) $(CF_3(CF_2)mSO_2)_2NLi$; wherein m is 0 to 7,
content of the component (3) being 0.5 to 15 parts by weight in relation to 100 parts by weight of total of the component (1) and the component (2); and
(4) a radical photopolymerization initiator,
content of the component (4) being 0.1 to 20 parts by weight in relation to 100 parts by weight of total of the component (1) and the component (2).

2. The photocurable resin composition according to claim 1 wherein the photoreactive group-containing siloxane compound of the component (1) comprises the system containing the components (a) to (c) further comprising
(d) another hydrolyzable silane represented by the following general formula (v):

wherein $R^7$ is an alkyl group containing 1 to 10 carbon atoms, cyclohexyl group, or phenyl group, $R^8$ is an alkyl group containing 1 to 4 carbon atoms or acetyl group, and d is an integer of 0 to 3; and
the component (1) is the one produced by hydrolyzing and condensing the system comprising the components (a), (b), (c) and (d) in the presence of a basic catalyst by using water at an amount in excess of the amount required for hydrolyzing and condensing all hydrolyzable groups.

3. The photocurable resin composition according to claim 1 wherein the component (a) is $CH_2=CHCOOC_3H_6Si(OCH_3)_3$.

4. The photocurable resin composition according to claim 1 wherein the component (b) is dimethylsiloxane having both ends endcapped with trimethoxy group represented by the following general formula:

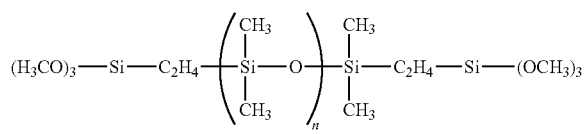

wherein n is an integer of 5 to 100.

5. The photocurable resin composition according to claim 1 wherein the component (c) is the one represented by the following general formula:

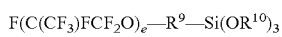

wherein $R^9$ is $C(CF_3)FCH_2OC_3H_6$ or $C(CF_3)FC(=O)NHC_3H_6$, $R^{10}$ is an alkyl group containing 1 to 4 carbon atoms or acetyl group, and e is an integer of 2 to 50.

6. The photocurable resin composition according to claim 1 wherein the basic catalyst used in producing the component (1) is tetraalkylammonium hydroxide.

7. The photocurable resin composition according to claim 1 wherein the component (1) has a weight average molecular weight of up to 5,000.

8. The photocurable resin composition according to claim 1 wherein the silanol group content of the component (1) is up to 2% by weight.

9. The photocurable resin composition according to claim 1 wherein the component (3) is $(CF_3SO_2)_2NLi$.

10. The photocurable resin composition according to claim 1, wherein component (b) is used at 0.01 to 10 parts by weight in relation to 100 parts by weight of component (a), and component (c) is used at an amount of 0.01 to 30 parts by weight in relation to 100 parts by weight of component (a).

11. An article having formed thereon a cured coating of the photocurable resin composition of claim 1.

* * * * *